April 17, 1928. 1,666,826
A. LEMAY
EYEGLASSES
Filed May 4, 1925
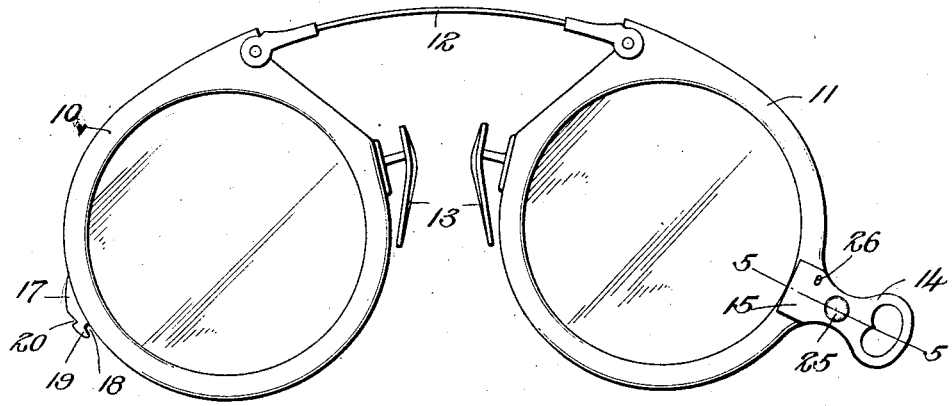
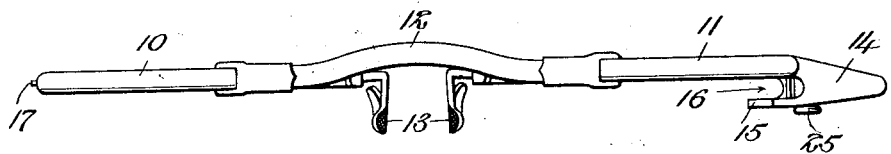
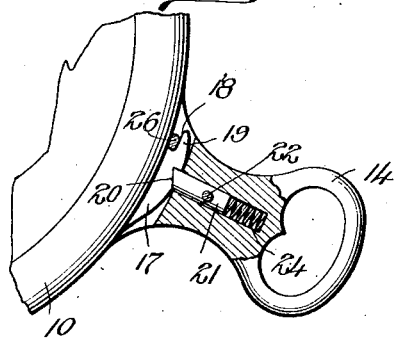
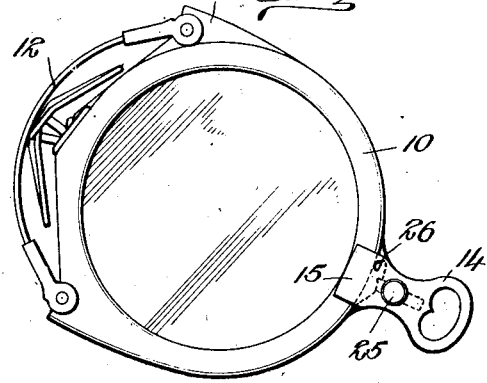
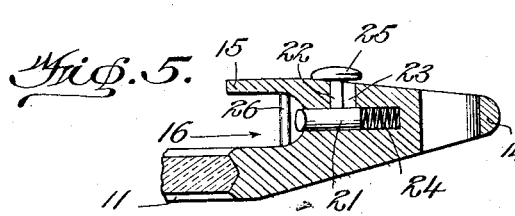
Inventor
Arthur Lemay,
by Bright & Bailey
Attorneys Patented Apr. 17, 1928.

1,666,826

UNITED STATES PATENT OFFICE.

ARTHUR LEMAY, OF BROOKLYN, NEW YORK.

EYEGLASSES.

Application filed May 4, 1925. Serial No. 27,897.

My invention relates to eyeglasses of the type in which a spring constitutes the bridge between the lens frames, whereby the latter may be folded one over the other, and my purpose, generally speaking, is to provide improved means for retaining the lens frames in folded relation.

More particularly it is my purpose to provide an extremely simple, cheap and efficient arrangement which will prevent one lens frame from sliding too far over the other during folding, and which will act positively to prevent accidental unfastening of the frames as well as relative movement between the latter in all directions when folded.

With the foregoing and other purposes in view, my invention consists in the novel features of construction, combination and arrangement of parts as will be hereinafter more fully described, illustrated in the accompanying drawings and defined in the appended claim.

In the drawings, wherein like characters of reference denote corresponding parts in the different views:—

Figure 1 is a rear elevation of a pair of eyeglasses embodying my improvements;

Figure 2, a top plan view;

Figure 3, a view similar to Figure 1 showing the lens frames folded;

Figure 4, an enlarged detail section showing my improved means for retaining the lens frames folded; and Figure 5, a section on the line 5—5 of Figure 1.

Referring to the drawings in detail, 10 and 11 designate the lens frames connected together by a spring bridge 12 and carrying, as is usual, nose guards 13.

One of the lens frames, frame 11 in this instance, is provided with an outwardly extending handle 14, and carried by this handle is an inwardly extending lip 15 overlying and spaced from the adjacent inner face portion of said frame, thereby to provide a recess 16 adapted to receive a portion of the other lens frame 10 when the frames are folded as shown in Figure 3 of the drawings.

Secured to the lens frame 10 is a small plate 17 which projects outwardly from the periphery of said frame at a point thereon, so that when the frames are folded as shown in Figure 3 it will be disposed within the recess 16, between the lip 15 and an adjacent portion of handle 14, and, as best shown in Figures 1 and 4, the end of this plate which first enters recess 16 during folding of the frames 10 and 11 is undercut as at 18, thereby providing a bill 19. In addition, the outer edge of said plate, slightly to the rear of the undercut 18, is notched as at 20.

A small bore is formed in the handle 14 and arranged within this bore for sliding movement radially with respect to the lens frame 11 is a plunger 21, limited in its sliding movement by a stem 22 carried thereby and riding in a slot 23 in the handle 14, the length of said slot determining the permissible amount of movement of said plunger as is manifest. A small coil spring 24 acting against said plunger urges the inner, beveled end of the latter normally into the recess 16, while a small knob 25 on stem 22 provides a convenient means of retracting said plunger against the force of said spring.

Extending across the space between the handle 14 and the lip 15 is a pin 26 positioned to enter the undercut 18 in plate 17 when the lens frames are folded.

When folding the glasses, frame 10 is swung over frame 11 from the position of Figure 1 to the position of Figure 3 in which latter position the frames are superimposed, and as plate 17 passes through the recess 16 its outer edge contacts with the beveled inner end of plunger 21 and forces the same outward against the spring 24, so that when frame 10 is moved to complete folded position said plunger will snap into notch 20 and thus lock the frames against unfolding until knob 25 is manipulated to withdraw said plunger from said notch. When the frame 10 reaches a complete folded position with respect to frame 11, pin 26 will have moved into the undercut 18 and the bill 19 will be disposed to the outside of said pin so that the lens frames also are held not only against swinging movement, but against relative movement in all directions, since the pin 26 and bill 19 in conjunction with plunger 21 and notch 20 prevent any sliding movement of one frame over the other, while the lip 15 prevents any separation of the frames. Merely by pressing outward on knob 25, however, plunger 21 may be disengaged from notch 20 and the bowed spring bridge 12 will act immediately to swing the frames to their normal position shown in Figure 1.

I claim:

In a pair of eyeglasses, a pair of lens frames, a spring bridge connecting said frames, a handle carried by one of said frames, a lip carried by said handle overlying and spaced from the frame carrying said handle, thereby providing a recess into which a portion of the other frame is receivable, a plate on said last mentioned frame undercut at one end to provide a bill and also having a notch formed therein, a pin extending across said recess and connecting said lip with a portion of the frame carrying said handle serving to prevent said lip from spreading outwardly with respect to the frame carrying same, said bill being engageable with said pin to prevent sliding movement of the frames across one another, and a plunger slidably mounted in said handle engageable with said notch to retain said bill in engagement with said pin.

In testimony whereof I hereunto affix my signature.

ARTHUR LEMAY.